United States Patent

[11] 3,607,339

[72] Inventor William Davies
 Stirling, Scotland
[21] Appl. No. 709,960
[22] Filed Mar. 4, 1968
[45] Patented Sept. 21, 1971
[73] Assignee John G. Stein & Company Limited
 Bonnybridge, Scotland
[32] Priority Mar. 2, 1967, May 2, 1967
[33] Great Britain
[31] 9,923/67 and 20,351/67

[54] SINTERED AGGREGATES
 8 Claims, No Drawings
[52] U.S. Cl. .................................................. 106/309,
 106/40, 106/288 B
[51] Int. Cl. .................................................. C09c 1/00
[50] Field of Search ........................................... 106/309,
 288 I, 40, 40 V

[56] References Cited
 UNITED STATES PATENTS
2,399,225 4/1946 Heany ........................... 106/40 V
2,485,724 10/1949 Ford ............................. 106/40 X
2,514,324 7/1950 Ford ............................. 106/40 V
2,582,852 1/1952 Shoemaker.................... 106/40 V
2,600,525 6/1952 Ford ............................. 106/40 V
2,611,712 9/1952 Ford ............................. 106/40 V
2,987,411 6/1961 Minnick ........................ 106/288 I
3,030,222 4/1962 Eichenlaub................... 106/288
 FOREIGN PATENTS
 457,273 6/1949 Canada ......................... 106/40 V
 528,008 10/1940 Great Britain................ 106/40 V

*Primary Examiner*—James E. Poer
*Assistant Examiner*—H. M. S. Sneed
*Attorney*—Sughrue, Rothwell, Mion, Zinn & Macpeak ABSTRACT: A synthetic aggregate suitable for use in a road surface is prepared by sintering together particles of hard mineral or ceramic material, a flux, and at least sufficient combustible material to complete the endothermic changes occurring in the sintering. The sintered product is in the form of hard particles linked in a cellular structure by strong crystalline ceramic bonds.

SINTERED AGGREGATES

Road surfaces are normally formed from aggregates such as crushed stone, slag or similar material, either bound by a waterproof binder such as bitumen, tar or asphalt, or combined with cement and sand to form concrete slabs or a continuous concrete carpet.

The rate of wear of road surfaces has greatly increased in recent years, due both to an increase in the number of vehicles, especially heavy lorries, on the roads, and to an increase in their speeds. As a result of this, stringent specifications have been devised for aggregates to be used in the surfacing of roads subjected to heavy traffic.

Expressed in qualitative terms, the most important requirements for a heavy-duty surfacing aggregate are as follows. First, the aggregate should be composed of angular pieces or fragments graded or sized to give a tough well-knit texture, resistant to wheel-skid even under wet conditions. Second, the individual pieces of aggregate must not develop a polished surface as they wear under traffic conditions but should continuously develop new rough surfaces. Third, the pieces should not crumble under impact due to wheel bounce. Fourth, the pieces should be resistant to abrasion. Fifth, the pieces should not absorb moisture in such a manner that they are susceptible to disintegration by the action of frost. Sixth, the aggregate should wear clean and should most desirably present a light-colored surface, that is, should not absorb light but scatter it, thereby obviating the dazzle experienced from vehicle headlights at nighttime on wet, dark-surfaced roads. Finally, of course, it is highly desirable that the aggregate should be cheap.

Of the many aggregates in use at the present, none presents the ideal combination of these properties. Uncrushed quartz pebbles, though light-colored, soon develop a smooth surface of low skid-resistance in wet weather. Limestone, though much softer, likewise develops a slippery surface. Whinstone, though it may give good skid resistance, presents a dark surface. Slags, though cheap byproducts of smelting processes, have properties which can vary widely due to fluctuations in the smelting processes in which they are formed.

Our object in this invention is to provide a synthetic aggregate having a desirable combination of these properties and formed from cheap, easily available raw materials. Essentially the aggregate consists of particles of sand, bauxite, crushed refractory brick or other hard mineral or ceramic material sintered together to form small pieces or to form a porous cake. The pieces can be used directly, or they or the cake can be crushed to gradings suitable for road surfacing.

The sintering process by which the aggregate is produced is an important feature of the invention, and its effect is to bond the hard particles by a ceramic bond into porous aggregates without melting the particles. The charge to be sintered must therefore include at least one substance which will act as a flux at the sintering temperature. It must also include at least sufficient combustible matter to complete the endothermic changes occurring in the sintering.

Crystallization of the ceramic bond provides myriads of small reflecting surfaces providing for light scatter without unidirectional reflection, thereby obviating night dazzle on wet roads. The intrinsic finely porous or cellular structure of the aggregate, being closed or sealed, does not absorb water except superficially on broken surfaces. Its strength properties and resistance to impact are high due to its cellular structure formed with strong crystalline ceramic bonds. The aggregate is inherently angular and its fractured surfaces present sharp edges along the broken cell walls, both features providing sharp edges in service to cut the water film on wet roads and thus to enhance skid resistance. The sand, bauxite or other hard particles increase abrasion and skid resistance, and, as wear proceeds, ultimately tear out and expose fresh sharp surfaces in the aggregate. If the charge to be sintered contains less than 1 percent, and preferably less than 0.5 percent, of ferric oxide, the aggregate will be light-colored, almost white, and this may be highly desirable under certain conditions.

The characteristics of some types of natural aggregate are such that the aggregate will not readily bond with tar or the like. The same characteristics that provide good skid resistance in the novel synthetic aggregate also provide a good key for tar or similar binders.

The flux may be, for example, limestone, dolomite, clay or fluorspar, and may be added to the hard particles in the charge to be sintered. The flux may include glass, such as powdered waste glass or scrapped glass bottles. Alternatively some or all of the flux, instead of being introduced into the charge to be sintered as a separate constituent, may be added as felspar or clay contained in the sand, sandstone or gritstone that provides the hard particles. Examples of such flux-containing materials are certain soft sandstones occurring in the millstone grit formation which are composed of sand grains, loosely bonded together with from 15 to 20 percent clay; certain other sandstones in the millstone grit formation which contain from 80 to 85 percent quartz and 10 to 15 percent felspar with the balance clay; and some sand deposits which contain from 10 to 20 percent clay.

If the whole of the flux is in the form of clay or limestone, the evolution of steam and carbon dioxide under the action of heat during the sintering leads to the formation of numerous bubbles, giving the bond a cellular texture. This is in part due to the rapid rise in temperature during the sintering. Another feature of the invention comprises the introduction of some of the flux as calcined material, such as crushed brick recovered from old buildings, or crushed red shale from burnt-out colliery waste tips, with the result that the porosity of the ceramic bond is reduced.

The charge that is sintered must form a gas-permeable mass, and it is desirable to agglomerate or pelletize the charge so as to increase its permeability. To allow this to be done easily it is advantageous if some portion of the flux is plastic, such as clay. Generally a minimum of 5 percent of clay is desirable, though with certain clays of very high plasticity the clay content may be as little as 1 percent.

In the sintered product the proportion of the hard particles may vary widely, say between 50 and 95 percent by weight, though preferably between 70 and 90 percent. The flux such as clay, limestone or dolomite, is of course in the calcined form in the final product, which may advantageously be derived from 0 to 30 percent, but preferably from 2 to 10 percent, of clay, and from 0 to 3 percent, but preferably from 0.5 to 1.5 percent, of fluorspar, and contain from 0 to 40 percent, but preferably from 5 to 25 percent, in all of calcium oxide (CaO) or of magnesium oxide (MgO) or of both.

The sintering process may be carried in different forms of sintering plant, for example on a travelling grate, or in a shaft kiln or in a rotary kiln. Each such process will be described in turn, and, whatever process is used, if it is appropriately carried out, the fine pores within the aggregates will be nearly all closed. Whatever the nature of the sintering process, it is advantageous to include quartz sand in the hard particles, as aggregates incorporating quartz sand grains show a particular advantage consequent on the heat treatment during sintering. Superficially these quartz grains are converted to tridymite or cristobalite in finely crystalline form which makes the quartz grains themselves white and reflecting. A further feature of aggregates containing quartz sand is that internal cracks develop in the individual quartz grains during sintering, whereby the quartz grains, instead of becoming polished, maintain a rough surface due to the plucking out of tiny fragments by the tires of passing traffic.

Throughout the whole sintering process the charge must be gas-permeable and present large interconnecting pores providing passages for the continued access of air so that combustion of the whole mass may be completed. Preferably the hard particles, whether all of one kind, or, for example, a mixture of sand and bauxite, will initially all pass through a one-half inch mesh screen but be retained on a 100 B.S. mesh. Within this range the grading of the particles is not critical, though if coarse particles, say +¼ inch, are present, it is desirable that sufficient fine particles should also be present to give numerous points of contact between the fine and coarse particles for the development of a strong sintered structure. The flux should be finely divided and intimately mixed with the other particles. Limestone ($CaCO_3$) and dolomite ($CaCO_3MgCO_3$) may be added wholly or in part as the calcines (CaO,MgO) or hydrates ($Ca(OH)_2$,$Mg(OH)_2$). If the whole charge is provided in a finely divided state, it is desirable to agglomerate or pelletize it so as to increase its permeability. This may be done by moistening the charge and rolling it in a drum mixer. To facilitate pelletizing, a bonding agent such as lime or calcined dolomite or sodium silicate may be added, and will also act as a flux during the sintering. Combustible material may be incorporated in the agglomerates, or dusted over them as a coating, or loosely admixed with the agglomerates or with the remainder of the charge if there are no agglomerates.

The production of the ceramic bond, of course, involves superficial melting, and the nature of the final bond depends on the subsequent rate of cooling. The temperatures attained in the course of the sintering are thus important. Broadly in the combustion zone the temperature may be between 900° and 1500° C., but it is much preferred to maintain it between 1100° and 1400° C. The temperature depends largely on the composition of the charge, and must be controlled to attain the desired result. It is desirable that the bonds should be finely crystalline and in a stress-relieved state, and to attain this the sinter should be annealed by the passage of hot air through it.

When sintering is carried out on a moving grate, the charge to be sintered is formed into a gas-permeable bed on the grate and air is drawn through the bed either upwards or downwards. When the bed has been ignited, combustion does not proceed simultaneously throughout the whole depth of the bed. On the contrary, combustion at any instant is limited to a nearly horizontal zone generally less than 1 inch thick in a bed, say, 10 to 20 inches deep. In the down-draught process, the combustion zone is overlain by finished sinter and rests on unburnt material: in updraught sintering, the finished sinter and unburnt material are in the reverse positions.

It is highly desirable that the sintered product should have uniform properties, and to achieve this the bed must undergo the same heat cycle throughout its whole depth. To satisfy this and the other requirements in the sintering process the proportion of combustible matter in the bad must be controlled, and if possible should be the theoretical requirement for completion of the endothermic sintering reactions or at most only marginally exceed it. If the proportion is substantially in excess of this the bed will gain in heat content as combustion proceeds. In the extreme, the bed could attain such temperatures that the material in the combustion zone would become completely molten and so fluid that the large interconnecting pores would collapse and combustion would then cease for lack of air. Not only must this be avoided, but as far as possible each successive layer in the bed should reach the same temperature for the same period of time.

The amount of combustible matter required depends also on the proportion of volatile matter in the flux of fluxes and on the amount of water added if the mixture is agglomerated or pelletized. In general, the proportion of the combustible matter in the mixture should be from 2 to 8 percent by weight, and from 3 to 5 percent when the hard particles and fluxes are such as to yield the preferred proportions in the final product given above.

In the combustion zone much of the original structure of the bed is lost, being replaced by a spongelike mass with large interconnecting pores between finely porous aggregates. Within the aggregates, the hard particles react superficially with the fluxes to develop a ceramic bond, generally more or less crystalline in nature and comprising predominantly silicate materials when the hard particles are silica-rich, e.g. quartz sand, and possible spinels when alumina-rich particles, e.g. bauxite, are included.

In a conventional sintering process, the temperature increases as the combustion zone proceeds through the bed, with the result that the product is not uniform. Thus the top of the bed (when downdraught is used) may be inadequately sintered. Moreover, in conventional sintering, the surface of the bed is ignited by a flame produced under some form of ignition hood, and as soon as ignition is established the flame is extinguished, or if the grate travels, as in Dwight and Lloyd plants, the ignited surface travels away from the hood. In either case cold air is drawn into the bed and the finished sinter is in effect airquenched, not annealed.

In the invention it is preferred to ignite the surface of the bed by a flame and thereafter to continue to preheat the air that passes through the ignited bed so that the part of the bed that is already sintered does not cool too quickly. Progressively less preheat is needed as the combustion zone moves through the bed and the depth of the sintered material increases, until a stage is reached at which cold air is adequately heated by the cooling sintered material through which it first passes to prevent the hot sintered material from being subjected to shock cooling. If the grate is stationary, this controlled preheating may be effected by igniting the bed by a burner hood, fired by gas or oil, in such a way that the surface of the bed is raised as quickly as possible to the required reaction temperature for sintering. Thereafter the temperature of the hood is reduced progressively by increasing the air-fuel ratio so that only part of the incoming oxygen is burnt in the hood. The resultant waste gases and unused oxygen are then drawn into the bed, where the latter is consumed by combustion of the fuel in the bed. Generally the annealing of the initially ignited layer will be completed by the time the combustion zone has travelled from 5 to 6 inches into the bed. At this stage the flame in the hood is cut off. During the sintering of the remainder of the bed, the passage of cold air through the finished cooling sinter is sufficient to preheat the air before it enters the newly formed sinter and thus an annealing effect is obtained. If the grate travels, the bed may pass under a succession of hoods operating at progressively higher air-fuel ratios and, of course, lower temperatures: these hoods cover the bed until the combustion zone is say from 5 to 6 inches below the bed surface, after which the bed surface is exposed.

The product after discharge from the grate is crushed and screened to form aggregate. Undersize material may be returned and incorporated in further feed material, thereby eliminating waste.

Two examples will now be given of the formation of aggregate by sintering on a grate.

Example 1

| The charge used was made up as follows: | |
|---|---|
| Coarse quartzite sand, | 80% by weight |
| Ball clay, ground minus 100 BSS mesh, | 3% by weight |
| Dolomite, ground minus 60 BSS mesh, | 15% by weight |
| Burnt lime, ground minus 60 BSS mesh, | 1% by weight |
| Fluorspar, ground minus 60 BSS mesh, | 1% by weight |
| Coke breeze, ground minus 1/16 inch | 5% by weight |
| Moisture | 7% by weight |

Agglomerates were formed by adding the moisture to the charge as it was passed through a rotary drum.

The ferric oxide content of the mixture was less then 0.5 percent. The agglomerated feed was formed into a bed 12 inches deep on a grate and ignited by air-propane burners for 1 minute, the consumption of propane being 2.4 cu. ft. per sq. foot of bed area with minimum excess air. Thereafter the incoming air was preheated according to the following schedule:

| Minutes after ignition | Cubic feet of propane in 50 cu. ft. of air per minute per sq. ft. of bed surface |
|---|---|
| from 1 to 2 | 1.0 |
| from 2 to 3 | 0.7 |
| from 3 to 4 | 0.5 |
| from 4 to 5 | 0.3 |

Preheating then ceased, the combustion zone being from 5 to 6 inches below the bed surface. The maximum temperature attained was 1300° C. At the close of sintering, the product was discharged as a white, spongelike cake which was crushed to give an aggregate.

Example 2

The procedure was the same as in example 1, but calcined bauxite crushed to minus one-fourth inch was substituted for the quartzite sand in the same proportion. In this case the product consisted of grey bauxite grains bonded together by a near white bond. Otherwise it had similar properties to that produced in example 1.

When sintering is carried out in a shaft kiln, the charge is introduced at the top and moves downwards. Combustible material may be added in solid form as coal or coke to the charge and combustion controlled solely by the admission of air. Combustion is again confined to a thin zone overlain by unburnt feed and underlain by product, but this zone is kept static in position. The air is admitted through the cooling product and the hot gases from the combustion zone rise up through the feed, so preheating it. However, some or all of the heat required may be provided by liquid or gaseous fuel supplied by burners located between the top and bottom of the bed in the kiln. Part of the air for combustion may be admitted with the liquid or gaseous fuel, the remainder advantageously being drawn or blown through the product below the combustion zone, thereby cooling it and, of course, preheating the air before it enters the combustion zone.

An example will now be given of the formation of aggregate by sintering in a shaft kiln.

Example 3

| The charge used was made up as follows: | |
|---|---|
| Coarse quartzite sand | 80% by weight |
| Ball clay, ground minus 100 BSS mesh, | 3% by weight |
| Dolomite, ground minus 60 BSS mesh, | 15% by weight |
| Burnt lime, ground minus 60 BSS mesh, | 1% by weight |
| Fluorspar, ground minus 60 BSS mesh, | 1% by weight |
| Coke breeze, ground minus 1/16 inch | 5% by weight |
| Moisture | 7% by weight |

Agglomerates about 1 inch in diameter were formed by adding the moisture to the remainder of the charge in a rotary drum. These agglomerates were charged to a pilot-plant-scale shaft kiln 20 feet high, in which additional heat was supplied at a point 10 feet below the top by oil burners operating with excess air and providing 100,000 B.t.u.'s per ton of feed. The product was essentially the same as that produced in example 1.

When sintering is carried out in a rotary kiln, the charge is again preferably agglomerated or pelletized, sufficient solid fuel may be introduced into the kiln with the charge to complete the sintering, or the sintering may be effected entirely or in part by oil or gas burners directed into the kiln from either end, more usually from the discharge end.

I claim:

1. A process for producing a synthetic aggregate suitable for use in a road surface which comprises forming agglomerates of a mixture consisting essentially of
   i. from 50 to 95 percent particles of minerals selected from the group consisting of hard mineral and ceramic materials of a size ranging from one-half inch to 100 mesh,
   ii. from 2 to 8 percent of a combustible material and
   iii. a flux selected from the group consisting of limestone, dolomite, clay, felspar and fluorspar, developing ceramic bonds between said agglomerates by sintering, and if necessary, crushing the resultant sintered product to a suitable size.

2. A process according to claim 1 in which the temperature in the combustion stage of the sintering is maintained between 1100° and 1400° C.

3. A process according to claim 1 in which the raw materials are employed in such proportions that the final product contains by weight from 70 to 90 percent of the hard particles, and the remainder of the final product is derived from 2 to 10 percent of clay, and from 0.5 to 1.5 percent of fluorspar and contains from 5 to 25 percent in all of at least one member selected from the group consisting of calcium oxide and magnesium oxide.

4. A process according to claim 1 in which the charge is sintered as a gas-permeable bed on a grate through which air is drawn either upwards or downwards, the combustion proceeding in a zone that moves vertically through the bed, the surface of the bed is ignited by a flame and thereafter the air that is drawn through the ignited bed is preheated to a progressively less extent.

5. A process according to claim 1, in which the particles of materials are selected from the group consisting of sand, sandstone and gritstone and in which the flux is contained in the sand, sandstone as gritstone.

6. A process according to claim 1 in which the flux includes a member selected from the group consisting of a glass and a calcined material.

7. A process according to claim 1 in which the sintering is effected in a shaft kiln.

8. A process according to claim 1 in which the sintering is effected in a rotary kiln.